Patented June 23, 1936

2,044,851

UNITED STATES PATENT OFFICE 2,044,851

FROTH FLOTATION CONCENTRATION OF ORES

Cornelius H. Keller, San Francisco, Calif., assignor to Minerals Separation North American Corporation, New York, N. Y., a corporation of Maryland No Drawing. Application December 6, 1932, Serial No. 645,947

4 Claims. (Cl. 209—166)

This invention relates to the concentration of ores by flotation and is herein illustrated as applied to such method of ore concentration by the aid of a sulpho compound containing a phenyl radical, such as a benzyl xanthate, represented by the formula R—S—R' where R represents a non-nitrogenous carbon ring compound, such as a phenyl group, and R' represents a metal or hydrogen. It has been found that the froth-flotation concentration of ores may be effected very economically in the presence of such an agent, since the amount of mineral-frothing agent required is often considerably reduced from the amount otherwise necessary, and the time required for agitation of the ore pulp is often considerably reduced as compared with that required in the absence of such an agent. Moreover, where the new substance is used, the recoveries are often more complete or the concentrate is richer in values to the exclusion of normally floatable iron and other gangue, or both of these advantages are obtained.

This application is a continuation in part of my prior application Serial No. 82,577, filed January 20, 1926.

In the examples herein given one substance used was potassium benzyl xanthate, which is a non-nitrogenous aromatic compound containing a single phenyl group, and which is a sulphur-containing aromatic derivative of carbonic acid. This substance was prepared by dissolving potassium hydroxide in a small amount of water, adding the resulting solution to benzyl alcohol while stirring, and subsequently adding the carbon disulphide. Molecular proportions of benzyl alcohol, potassium hydroxide and carbon disulphide were used, yielding a product which appeared to contain a little free benzyl alcohol. The resulting potassium benzyl xanthate was soluble in water, slightly hygroscopic, and gave the characteristic xanthate reactions with metallic salts.

Sodium benzyl xanthate was also tested. It was prepared as follows:—Benzyl alcohol was dissolved in ether, treated with the requisite amount of metallic sodium to form sodium benzyl alcoholate and the resulting solution mixed with the requisite amount of carbon disulphide to form the sodium benzyl xanthate. The resulting crystals were washed with ether to remove free benzyl alcohol. Potassium benzyl xanthate was also similarly prepared. It was found that potassium and sodium benzyl xanthates thus prepared functioned similarly to the potassium benzyl xanthate as above first described. The phenyl sulpho compound in this form of benzyl xanthate was found to be useful in alkaline and neutral pulps and with copper ores and with complex ores such as silver-bearing lead-zinc ores.

The following tests were carried on in a Minerals separation subaeration spitzkasten testing machine.

*Example 1.*—Anaconda copper slimes were made into a pulp with the requisite amount of water and agitated for a period of five minutes with 0.4 pound of potassium benzyl xanthate per ton of ore. Then 0.15 pound of pine oil per ton of ore was added and the agitation continued for a further period of ten minutes. It was noted that during the first mentioned period of agitation, and before the pine oil was added, apparently due to the fact that both potassium benzyl xanthate and benzyl alcohol were present, a large proportion of the copper mineral was floated and the float was relatively free of iron. The further float obtained upon the addition of pine oil appeared to contain a larger proportion of iron. The whole operation, however, indicated that the potassium benzyl xanthate greatly facilitated the flotation of the copper sulphide present to the exclusion of the iron which was normally floatable. The iron content was determined by inspection. The results in copper concentrate and recovery are shown in the following table:

| | Assays | | Recoveries |
|---|---|---|---|
| | % Wt. | Cu | Cu |
| Heads | 100.0 | 3.60 | 100.0 |
| Conc. | 28.6 | 11.92 | 94.8 |
| Tails | 71.4 | .26 | 5.2 |

A parallel test using potassium benzyl xanthate from which all benzyl alcohol had been removed was made and no substantial frothing action could be observed. Upon the further addition of a small amount of benzyl alcohol the frothing conditions were as above described. It was also found that the benzyl alcohol alone produced only a small amount of froth with no substantial concentration of mineral. Similar results were obtained with Shattuck-Arizona ore in an alkaline pulp, a rich concentrate being obtained and a tailing which was low in copper content for this particularly refractory ore.

*Example 2.*—Shattuck-Arizona ore was reground for twenty minutes in a laboratory ball mill with lime, used at the rate of six pounds of calcium oxide per tone of ore. The ground ore was made into a suitable pulp by the addition of water and was agitated for fifteen minutes with 0.2 pound of potassium benzyl xanthate and 0.15 pound of pine oil, both per ton of ore, to form a rougher concentrate. This concentrate was re-agitated for five minutes without the addition of further reagents to yield a finished concentrate and a middling. The results are shown in the following table, from which it will appear that there was a large rejection of iron from the concentrate and no objectionable tendency of the iron to build up in the middlings:

|  | Assays | | | Recoveries | |
| --- | --- | --- | --- | --- | --- |
|  | % Wt. | Cu | Fe | Cu | Fe |
| Heads | 100.0 | 3.64 | 39.1 | 100.0 | 100.0 |
| Conc | 13.2 | 17.84 | 37.7 | 64.9 | 12.7 |
| Midd | 15.6 | 3.56 | 42.0 | 15.2 | 16.8 |
| Tail | 71.2 | 1.02 | 38.8 | 19.9 | 70.5 |

In concentrating a lead-zinc-silver ore the results were highly satisfactory and it was found that the amounts required of agents used, and particularly of pine oil, were substantially reduced and that the usual necessity of retreatment of the concentrate was obviated.

*Example 3.*—Suitably ground ore from the nine hundred foot level of the Tennessee mine near Chloride, Arizona, was made into a pump with water and agitated for ten minutes with 0.2 pound of benzyl xanthate and 0.1 pound of hardwood creosote, both per ton of ore, and a lead-bearing froth was separated. There was then added 1.4 pounds of water gas tar, 0.1 pound of pine oil, and 0.8 pound of copper sulphate, all per tone of ore, and the pulp was further agitated for fifteen minutes to yield a zinc-bearing froth. The results are shown in the following table:

|  | Assays | | | | Recoveries | | |
| --- | --- | --- | --- | --- | --- | --- | --- |
|  | % Wt. | Oz. Ag | % Pb | % Zn | Ag | Pb | Zn |
| Heads | 100.0 | 5.45 | 13.2 | 14.4 | 100.0 | 100.0 | 100.0 |
| Pb. Conc | 17.3 | 24.6 | 64.8 | 16.4 | 78.2 | 86.7 | 19.8 |
| Zn. Conc | 20.0 | 2.8 | 4.6 | 41.0 | 10.3 | 6.7 | 57.2 |
| Tails | 62.7 | 1.0 | 1.6 | 5.3 | 11.5 | 7.6 | 23.0 |

It was found that while potassium benzyl xanthate prepared as above described was fairly stable, nevertheless, when such material, prepared as first above described, was about a month old, it became somewhat modified in its properties, with the result that it was capable of use without the addition of any other mineral-frothing agent to produce a satisfactory concentration, and was also capable of use as an agent which cooperated with a mineral-frothing agent to facilitate and improve froth-flotation concentration.

*Example 4.*—Anaconda copper slimes were ground with lime equal to six pounds of calcium oxide per ton of ore and then made into a pulp with water and agitated for twenty minutes, with 0.4 pound per ton of ore of potassium benzyl xanthate upwards of a month old, to yield a finished concentrate. The results are shown in the following table:

|  | Assays | | Recoveries |
| --- | --- | --- | --- |
|  | Wt. % | Cu | Cu |
| Heads | 100.0 | 3.22 | 100.0 |
| Conc | 23.2 | 12.72 | 91.9 |
| Tails | 76.8 | .34 | 8.1 |

*Example 5.*—Suitably ground Bunker Hill and Sullivan ore was made into a pulp with water and agitated for a period of ten minutes with 0.3 pound per ton of ore of similar old potassium benzyl xanthate. One pound of water gas tar and one-tenth pound of pine oil per ton of ore were then added and the agitation continued for a further period of ten minutes. A satisfactory concentrate was obtained during the first mentioned period of agitation and a satisfactory middling was obtained during the second mentioned period of agitation. The results are shown in the following table:

|  | Assays | | | Recoveries | |
| --- | --- | --- | --- | --- | --- |
|  | % Wt. | Pb | Zn | Pb | Zn |
| Heads | 100.0 | 8.3 | 2.3 | 100.0 | 100.0 |
| Pb. Conc | 15.2 | 48.6 | 13.0 | 89.0 | 86.8 |
| Pb. Midd | 3.3 | 13.0 | 9.0 | 5.2 | 13.2 |
| Tails | 81.5 | 0.6 | No | 5.8 | No |

Other materials such as thiophenol, parathio cresol, benzyl mercaptan, phenyl-ethyl sulphide and the phenyl-ester of ethyl xanthic acid are also capable of use as agents which cooperate with a miner-frothing agent to facilitate and improve froth-flotation concentration.

*Example 6.*—Utah Copper Co. ore, reground to 65-mesh with 6 pounds of calcium oxide and 0.4 pound of thiophenol per ton, was made into a pulp with water and agitated with 0.4 pound of cresylic acid all reagents per ton of solids, the cresylic acid being upwards of 95% pure. The froth concentrate was separated and collected. The results are shown in the following table:

|  | Assays | | | Recoveries | |
| --- | --- | --- | --- | --- | --- |
|  | Wt. % | Cu % | Fe % | Cu | Fe |
| Heads | 100 | 1.25 | 1.36 |  |  |
| Conc | 4.42 | 25.76 | 13.5 | 90.8 | 43.8 |
| Tails | 95.58 | .12 | .8 | 9.2 | 56.2 |

*Example 7.*—Anaconda table tailings, 65-mesh, were made into a pulp with water and pre-agitated for half a minute in a neutral pulp with 0.32 pound of pine oil and 0.58 pound of benzyl mercaptan, both per ton of solids, and then further agitated to yield a froth-concentrate which was separated for three minutes. The results are shown in the following table:

|  | Cu % | Recovery % |
| --- | --- | --- |
| Heads | 1.28 |  |
| Concs | 7.44 | 90.1 |
| Tails | 0.15 |  |

*Example 8.*—Utah Copper Co. ore, reground to 65-mesh with 6 pounds of calcium oxide per ton of solids, was made into a pulp with water and agitated with 0.4 pound of a 20% solution of para-thio-cresol in cresylic acid and a further 0.4 pound of cresylic acid, both per ton of solids, which was upwards of 95% pure. The froth concentrate was separated and collected. The results are shown in the following table:

|  | Assays | | | Recoveries | |
| --- | --- | --- | --- | --- | --- |
|  | Wt. % | Cu % | Fe % | Cu % | Fe % |
| Heads | 100 | 1.26 | 1.63 | | |
| Concs | 4.91 | 22.96 | 13.8 | 89.4 | 41.6 |
| Tails | 95.09 | .14 | 1 | 10.6 | 58.4 |

*Example 9.*—Utah Copper Co. ore of low grade, ground to pass 80-mesh, was made into a pulp with water and preagitated for two minutes with 4 pounds of calcium oxide, 0.32 pound of pine oil, and 0.632 pound of phenyl-ethyl sulphide, all per ton of solids, and then further agitated for three minutes to yield a froth-concentrate which was separated for three minutes. The results are shown in the following table:

|  | Cu % | Recovery % |
| --- | --- | --- |
| Heads | 0.88 | |
| Concs | 7.25 | 79.3 |
| Tails | 0.20 | |

*Example 10.*—The phenyl ester of xanthic acid was prepared by adding amyl nitrite to a solution of aniline hydrochloride in cold acetic acid and precipitating the diazo compound with ether. The precipitate was washed with ether, dried, and dissolved in water cooled with ice. Then, while thus kept cool, an aqueous solution of potassium xanthate was added to make one molecule of potassium exanthate to one of the diazo compound. A yellow compound formed with the evolution of gas, finally forming a yellow oil at the bottom of the solution. This was dissolved in ether, filtered, and the filtered solution washed successively with dilute caustic potash, dilute hydrochloric acid and with water. The resulting reddish oily liquid was then used in froth-flotation procedures as follows:

Utah Copper Co. ore of low grade ground to pass 80-mesh, was made into a pulp with water and pre-agitated for one-half minute with 4 pounds of calcium oxide, 0.32 pound of pine oil, and 0.47 pound of the reddish oily liquid, all per ton of solids, and then further agitated for three minutes to yield a froth-concentrate which was separated for three minutes. The concentrate was reagitated for two minutes to clean it by separating into a middling and finished concentrate. The results are shown in the following table.

|  | Wt. % | Cu % | Recovery % |
| --- | --- | --- | --- |
| Heads | 100 | 0.83 | |
| Concs | 4.8 | 12.78 | 73.7 |
| Midd | 5.8 | 1.31 | 9.1 |
| Tails | 89.4 | 0.16 | 17.2 |

The results of the foregoing Examples 6 to 10 compare with a recovery approximating 55% in blank tests i. e., tests in which there was added no non-nitrogenous aromatic sulpho compound containing a single phenyl group.

Having thus particularly described certain embodiments of my invention what I claim is:

1. The process of concentrating an ore containtaining a mineral value and gangue, which consists in agitating an aqueous pulp of the ore containing benzyl xanthate so as to form a mineral-value-bearing froth, and separating the froth.

2. The process of concentrating an ore containing a mineral value and gangue including normally floatable iron, which consists in agitating an aqueous pulp of the ore containing benzyl xanthate so as to form a mineral-value-bearing froth carrying a relatively large amount of a mineral value and a smaller proportion of the normally floatable iron, and separating the froth.

3. The process of concentrating an ore containing a mineral value and gangue which consists in agitating an aqueous pulp of the ore containing a flotation agent having a formula including a ring the carbon atoms of which are six in number, such ring forming part of a xanthic acid radical, said agitation being so conducted as to form a mineral-value-bearing float, and separating the float.

4. The process of concentrating an ore containing a mineral value and gangue which consists in agitating an aqueous pulp of the ore containing a flotation agent having a formula including a phenyl group and a xanthic group, said agitation being so conducted as to form a mineral-value-bearing float, and separating the float.

CORNELIUS H. KELLER.